United States Patent
Hong et al.

(10) Patent No.: US 6,753,103 B2
(45) Date of Patent: Jun. 22, 2004

(54) DOUBLE LAYERED PERPENDICULAR MAGNETIC RECORDING MEDIA WITH NANOCRYSTALLINE STRUCTURED FEHFN SOFT MAGNETIC BACK LAYER

(75) Inventors: Sooyoul Hong, Sunnyvale, CA (US); Daehoon Hong, Daejeon (KR); Taekdong Lee, Seoul (KR); Hyung J. Lee, Cupertino, CA (US)

(73) Assignee: Samsung Electronics Co. Ltd. (KR)

( * ) Notice: Subject to any disclaimer, the term of this patent is extended or adjusted under 35 U.S.C. 154(b) by 0 days.

(21) Appl. No.: 10/264,394

(22) Filed: Oct. 4, 2002

(65) Prior Publication Data

US 2004/0067391 A1 Apr. 8, 2004

(51) Int. Cl.[7] .............................. G11B 5/66; G11B 5/70; H01J 1/00; B32B 15/00
(52) U.S. Cl. ........................ 428/694 TM; 428/694 TS; 428/611; 428/660; 428/681; 428/900; 427/128; 427/131
(58) Field of Search ............... 428/694 TS, 694 TM, 428/611, 660, 681, 694 TR, 900; 427/128, 131

(56) References Cited

U.S. PATENT DOCUMENTS

| | | | |
|---|---|---|---|
| 6,175,475 B1 * | 1/2001 | Lin et al. ............... | 360/324.11 |
| 6,677,061 B2 * | 1/2004 | Shimizu et al. ......... | 428/694 TS |
| 2002/0048693 A1 * | 4/2002 | Tanahashi et al. ..... | 428/694 TS |
| 2003/0104250 A1 * | 6/2003 | Shimizu et al. ..... | 428/694 MM |

* cited by examiner

*Primary Examiner*—Holly Rickman
(74) *Attorney, Agent, or Firm*—Irell & Manella LLP; Jeffrey P. Aiello

(57) ABSTRACT

A disk for a hard disk drive. The disk includes a first layer of magnetic material located over a substrate, an intermediate layer located over the first magnetic layer and a second layer of magnetic material located over the intermediate layer. The second layer may include cobalt and chromium. The intermediate layer may include titanium. The first magnetic layer include iron, hafnium and nitrogen (FeHfN). This composition of the first magnetic layer shows higher saturation magnetization and lower roughness, and increases the nucleation field of the disk.

11 Claims, 2 Drawing Sheets

DOUBLE LAYERED PERPENDICULAR MAGNETIC RECORDING MEDIA WITH NANOCRYSTALLINE STRUCTURED FEHFN SOFT MAGNETIC BACK LAYER

BACKGROUND OF THE INVENTION

1. Field of the Invention

The subject matter disclosed generally relates to the field of hard disk drives.

2. Background Information

Hard disk drives contain a plurality of magnetic heads that are coupled to rotating disks. The heads write and read information by magnetizing and sensing the magnetic fields of the disk surfaces. There have been developed magnetic heads that have a write element for magnetizing the disks and a separate read element for sensing the magnetic fields of the disks. The read element is typically constructed from a magneto-resistive material. The magneto-resistive material has a resistance that varies with the magnetic fields of the disk. Heads with magneto-resistive read elements are commonly referred to as magneto-resistive (MR) heads.

Each head is attached to a flexure arm to create an subassembly commonly referred to as a head gimbal assembly ("HGA"). The HGA's are attached to an actuator arm that has a voice coil coupled to a magnet assembly. The voice coil and magnet assembly create a voice coil motor that can pivot the actuator arm and move the heads across the disks.

Information is typically stored within annular tracks that extend across each surface of a disk. The voice coil motor can move the heads to different track locations to access data stored onto the disk surfaces. Each track is typically divided into a plurality of adjacent sectors. Each sector may have one or more data fields. Each data field has a series of magnetic transitions that are decoded into binary data. The spacing between transitions define the bit density of the disk drive. It is generally desirable to provide a high bit density to increase the overall storage capacity of the drive.

FIG. 1 schematically shows the layers of a double layered perpendicular magnetic recording ("PMR") media 1. The media is used as a disk for a hard disk drive. The double layer PMR media 1 includes a first magnetic layer 2 located over a substrate 3. The first magnetic layer 2 and substrate 3 are typically separated by an underlayer 4 that strengthens the adhesion of the first material.

The first magnetic layer 2 is covered with an intermediate layer 5 and a second layer of magnetic material 6. The second magnetic layer 6 is protected with an overcoat layer 7, typically a diamond-like-carbon (DLC). The overcoat layer 7 may be covered with a layer of lubricant 8 to minimize any frictional contact between the head and the disk.

The first magnetic layer 2, sometimes referred to as the soft underlayer is typically constructed from NiFe, CoZrNb, CoTaZr, etc. These material typically exhibit low saturation magnetization. Additionally, with compositions of the prior art it is difficult to obtain favorable negative nucleation fields in the disk.

BRIEF SUMMARY OF THE INVENTION

A disk for a hard disk drive. The disk includes a first layer of magnetic material separated from a second layer of magnetic material by an intermediate layer. The first layer of magnetic material includes iron, hafnium and nitrogen (FeHfN).

DETAILED DESCRIPTION

Disclosed is a disk for a hard disk drive. The disk includes a first layer of magnetic material located over a substrate, an intermediate layer located over the first magnetic layer and a second layer of magnetic material located over the intermediate layer. The second layer may include cobalt and chromium. The intermediate layer may include titanium. The first magnetic layer includes iron, hafnium and nitrogen (FeHfN). It has been found that this composition of the first magnetic layer shows higher saturation magnetization and lower roughness, and increases the negative nucleation field of the disk.

Figure 2:
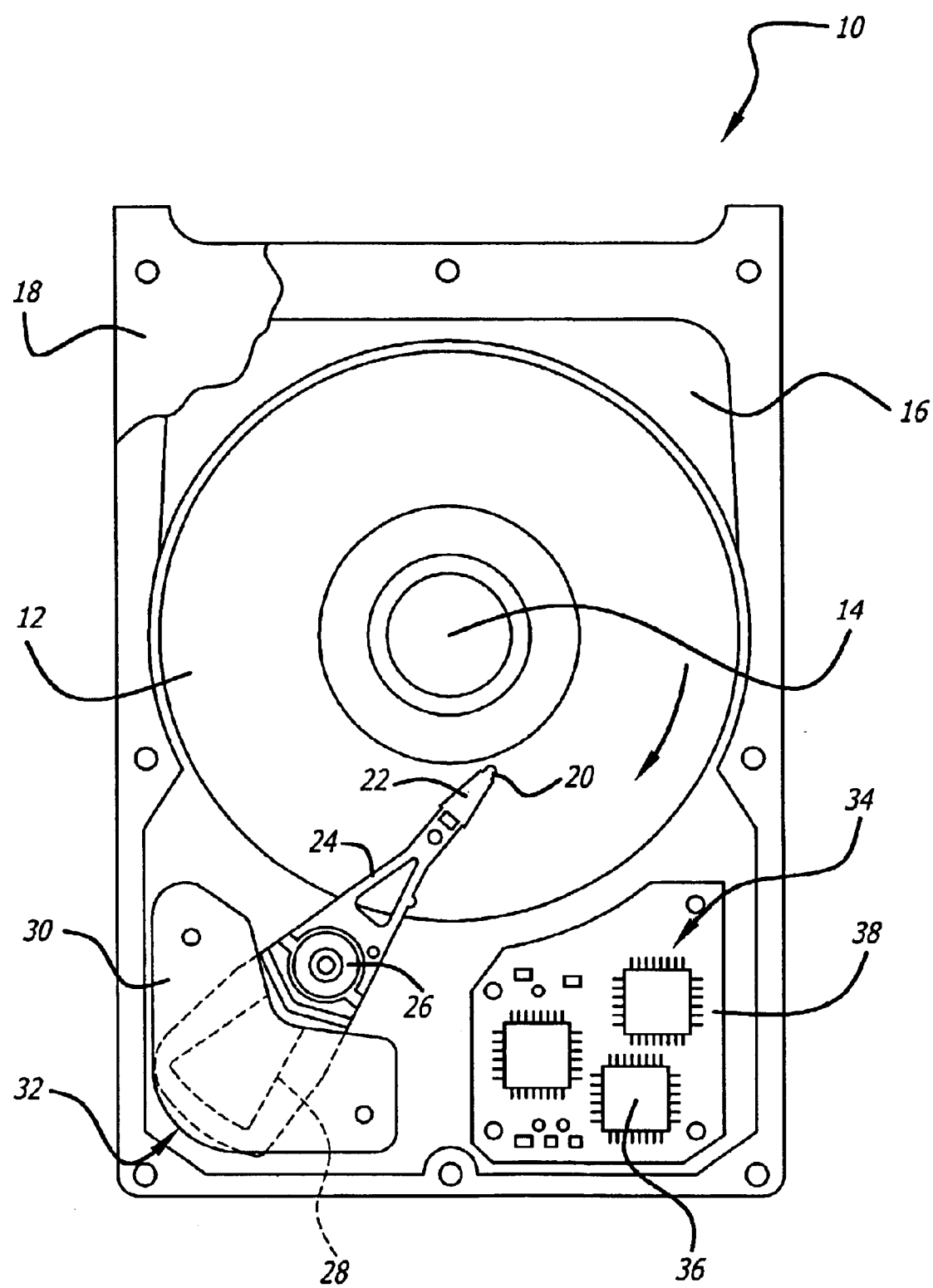
FIGS. 2 is a top view of a hard disk drive.

Referring to the drawings more particularly by reference numbers, FIG. 2 shows an embodiment of a hard disk drive 10. The disk drive 10 may include one or more magnetic disks 12 that are rotated by a spindle motor 14. The spindle motor 14 may be mounted to a base plate 16. The disk drive 10 may further have a cover 18 that encloses the disks 12.

The disk drive 10 may include a plurality of heads 20 located adjacent to the disks 12. The heads 20 may have separate write and read elements (not shown) that magnetize and sense the magnetic fields of the disks 12.

Each head 20 may be gimbal mounted to a flexure arm 22 as part of a head gimbal assembly (HGA). The flexure arms 22 are attached to an actuator arm 24 that is pivotally mounted to the base plate 16 by a bearing assembly 26. A voice coil 28 is attached to the actuator arm 24. The voice coil 28 is coupled to a magnet assembly 30 to create a voice coil motor (VCM) 32. Providing a current to the voice coil 28 will create a torque that swings the actuator arm 24 and moves the heads 20 across the disks 12.

Each head 20 has an air bearing surface (not shown) that cooperates with an air flow created by the rotating disks 12 to generate an air bearing. The air bearing separates the head 20 from the disk surface to minimize contact and wear. The formation of the air bearing and the general operation of the head 20 is a function of a force exerted by the flexure arm 22.

The hard disk drive 10 may include a printed circuit board assembly 34 that includes a plurality of integrated circuits 36 coupled to a printed circuit board 38. The printed circuit board 38 is coupled to the voice coil 28, heads 20 and spindle motor 14 by wires (not shown).

Figure 1:
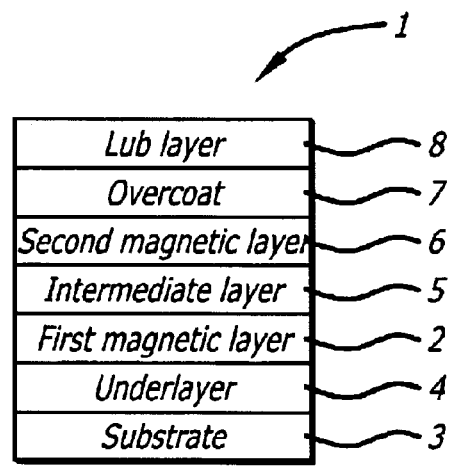
FIG. 1 is an illustration showing the various layers of a disk of the prior art.
Figure 3:
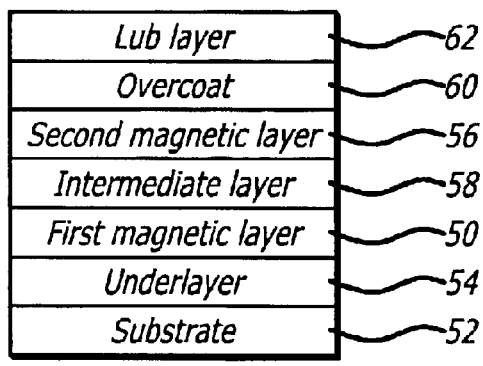
FIG. 3 is an illustration showing various layers of a disk of the hard disk drive.

FIG. 3 shows an embodiment of the disk 12. The disk 12 may include a first layer of magnetic material 50 that is located over a substrate 52. An underlayer 54 may be interposed between the media substrate 52 and the first layer 50 to improve the adhesion of the first material to the substrate 52. The substrate 52 may be constructed from an aluminum material. The underlayer 54 may include titanium. The first layer of magnetic material 50 includes iron, hafnium and nitrogen (FeHfN). By way of example, the first layer may have an atomic composition of 74% iron, 8% hafnium and 18% nitrogen. The underlayer 54 and first magnetic layer 52 may be formed by argon sputtering the corresponding material onto a heated substrate 52.

The first layer of magnetic material 50 may be separated from a second layer of magnetic material 56 by an intermediate layer 58. The second layer of magnetic material 56 may include cobalt, chromium, platinum, boron and tantalum. By way of example, the second layer 56 may include by atomic composition 20% chromium and 18% platinum. The intermediate layer 58 may include titanium. The intermediate layer 58 and second magnetic layer 56 may be formed by sputtering the corresponding material with an argon gas in an nitrogen reactive sputter.

The first layer of magnetic material 52 preferably has a nanocrystalline structure with a roughness of less than 5 angstroms. With such a structure it has been found that the media has a high anisotropy field (Ku) and an improved crystallography texture even within the intermediate layer 58. The FeHfN soft magnetic layer 50 improves thermal stability and the writing of data due to an increase in saturation magnetization and the negative nucleation field.

The disk 12 may include an overcoat layer 60 that protects the underlying magnetic layers. By way of example, the overcoat layer 60 may be a diamond-like-carbon (DLC) material that is extremely hard. To reduce friction between the head and the disk, the outer disk surface may include a layer of lubricant 62.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A magnetic disk for a hard disk drive, comprising:
   a substrate;
   a first magnetic layer located over said substrate, said first magnetic layer including iron, hafnium and nitrogen;
   an intermediate layer that is located over said first magnetic layer and contains titanium; and,
   a second magnetic layer located over said intermediate layer.

2. The disk of claim 1, wherein said intermediate layer is in contact with said first magnetic layer and said second magnetic layer is in contact with said intermediate layer.

3. The disk of claim 1, wherein said second magnetic layer includes cobalt and chromium.

4. The disk of claim 1, wherein said first magnetic layer is a nanocrystalline structure that has a roughness less than 5 angstroms.

5. A hard disk drive, comprising:
   a base plate;
   a spindle motor coupled to said base plate;
   a disk coupled to said spindle motor, said disk including;
      a substrate;
      a first magnetic layer located over said substrate, said first magnetic layer including iron, hafnium and nitrogen;
      an intermediate layer that is located over said first magnetic layer and contains titanum;
      a second magnetic layer located over said intermediate layer;
   an actuator arm mounted to said base plate;
   a voice coil motor coupled to said actuator arm;
   a flexure arm coupled to said actuator arm; and,
   a head coupled to said flexure arm and said disk.

6. The hard disk drive of claim 5, wherein said intermediate layer is in contact with said first magnetic layer and said second magnetic layer is in contact with said intermediate layer.

7. The hard disk drive of claim 5, wherein said second magnetic layer includes cobalt and chromium.

8. The hard disk drive of claim 5, wherein said first magnetic layer is a nanocrystalline structure that has a roughness less than 5 angstroms.

9. A method for fabricating a disk of a hard disk drive, comprising:
   forming a first layer of magnetic material over a substrate, the first layer of magnetic material including iron, hafnium and nitrogen;
   forming an intermediate layer over the first layer of magnetic material, the intermediate layer includes titanium; and,
   forming a second layer of magnetic material over the intermediate layer.

10. The method of claim 9, wherein said first magnetic layer is a nanocrystalline structure that has a roughness less than 5 angstroms.

11. The method of claim 9, wherein said second magnetic layer includes cobalt and chromiun.

* * * * *